(12) United States Patent
Tax et al.

(10) Patent No.: US 11,704,754 B2
(45) Date of Patent: Jul. 18, 2023

(54) SYSTEMS AND METHODS FOR PROMPTING A FOREIGN CURRENCY TRANSACTION

(71) Applicant: The Toronto-Dominion Bank, Toronto (CA)

(72) Inventors: David Samuel Tax, Toronto (CA); Milos Dunjic, Oakville (CA); Kushank Rastogi, Toronto (CA); Joseph Matthew Capern, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 305 days.

(21) Appl. No.: 17/111,777

(22) Filed: Dec. 4, 2020

(65) Prior Publication Data
US 2022/0180458 A1 Jun. 9, 2022

(51) Int. Cl.
| | |
|---|---|
| G06Q 30/00 | (2023.01) |
| G06Q 50/14 | (2012.01) |
| G06Q 40/04 | (2012.01) |
| G06Q 20/32 | (2012.01) |
| H04W 4/02 | (2018.01) |
| G06Q 20/38 | (2012.01) |
| H04W 4/20 | (2018.01) |
| G06Q 30/0601 | (2023.01) |

(52) U.S. Cl.
CPC ......... *G06Q 50/14* (2013.01); *G06Q 20/3224* (2013.01); *G06Q 20/381* (2013.01); *G06Q 30/0631* (2013.01); *G06Q 40/04* (2013.01); *H04W 4/02* (2013.01); *H04W 4/20* (2013.01)

(58) Field of Classification Search
CPC .. G06Q 50/14; G06Q 20/3224; G06Q 20/381; G06Q 30/0631; G06Q 40/04; H04W 4/02; H04W 4/20
See application file for complete search history.

(56) References Cited

U.S. PATENT DOCUMENTS

| | | | |
|---|---|---|---|
| 8,024,242 | B2 | 9/2011 | Galit |
| 8,229,845 | B2 | 7/2012 | Shintani et al. |
| 8,266,047 | B2 | 9/2012 | Galit |
| 8,285,643 | B2 | 10/2012 | Isaacson et al. |
| 8,479,981 | B2 | 7/2013 | Carmichael et al. |
| 8,688,525 | B2 | 4/2014 | Minde |
| 11,080,688 | B1 * | 8/2021 | Corrigan ............... G07F 19/211 |
| 2004/0172359 | A1 | 9/2004 | Nakamura |

(Continued)

*Primary Examiner* — Ethan D Civan
(74) *Attorney, Agent, or Firm* — Rowand LLP

(57) ABSTRACT

Computing devices, systems, and methods for automatically prompting a foreign currency transaction by detecting a trip end condition associated with a registered user with respect to travel to a foreign location associated with a foreign currency. The methods and system may further determine that the registered user has a remaining foreign currency balance, and, as a result, may identify and send to the registered user's mobile device at least one option for using the remaining foreign currency balance. The at least one option may be a merchant offer from a merchant located in the area of the mobile device or may include an option to exchange the foreign currency for another currency. The trip end condition may be detected by determining that the registered user and/or user's mobile device is at an international departure location. The currency exchange may be with another registered user.

22 Claims, 9 Drawing Sheets

(56) References Cited

U.S. PATENT DOCUMENTS

| | | | |
|---|---|---|---|
| 2009/0063316 A1* | 3/2009 | Travis | G06Q 40/02 |
| | | | 705/35 |
| 2013/0018738 A1* | 1/2013 | Faires | G06Q 20/381 |
| | | | 705/16 |
| 2013/0030994 A1 | 1/2013 | Calman et al. | |
| 2014/0142992 A1 | 5/2014 | Nuzzi et al. | |
| 2014/0279302 A1 | 9/2014 | Akin | |
| 2014/0379556 A1 | 12/2014 | Choi | |
| 2016/0283992 A1* | 9/2016 | Zamer | G06Q 30/0625 |
| 2017/0178229 A1 | 6/2017 | Koh | |

* cited by examiner

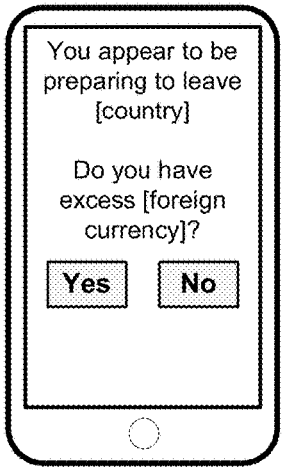
FIG. 10a
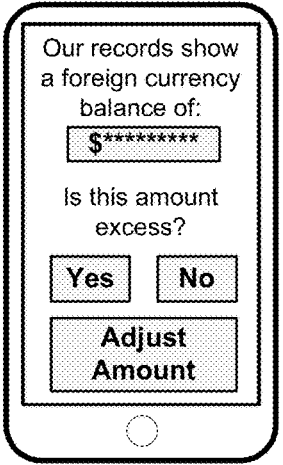
FIG. 10b
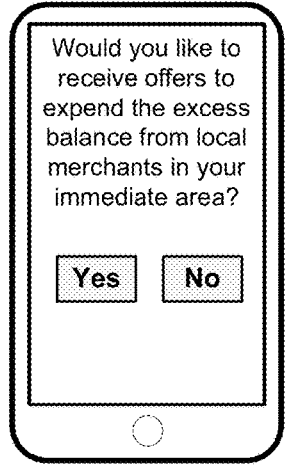
FIG. 10c
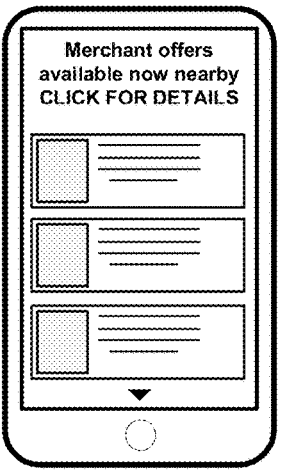
FIG. 10d
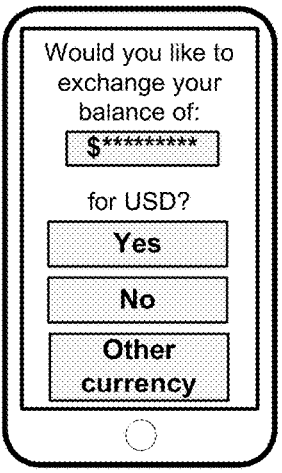
FIG. 10e
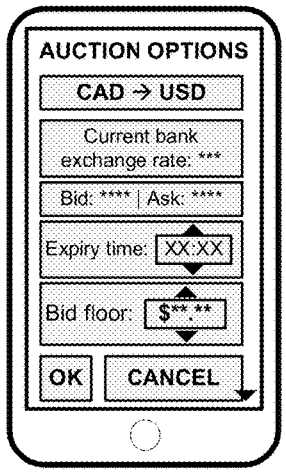
FIG. 10f
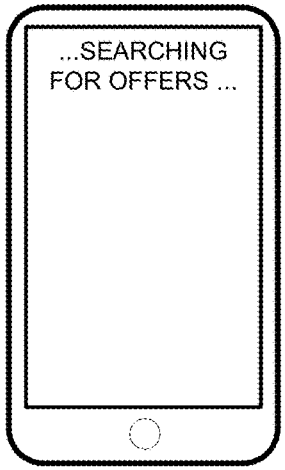
FIG. 10g
FIG. 10h
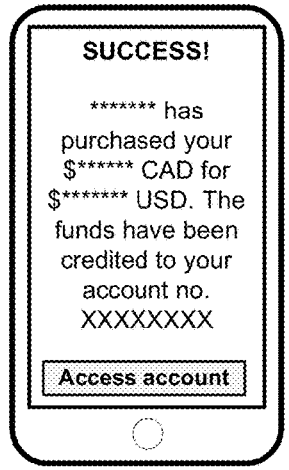

SYSTEMS AND METHODS FOR PROMPTING A FOREIGN CURRENCY TRANSACTION

TECHNICAL FIELD

The present application relates to methods and systems for prompting foreign currency exchanges or expenditures in connection with detected departure from a foreign country.

BACKGROUND

When traveling to a foreign country, many travelers obtain foreign currency prior to travel or shortly after arriving in the foreign country to facilitate purchases while in the foreign country. In many cases, the traveler may obtain the foreign currency in the form of cash from a bank or other financial institution, or from a dedicated foreign exchange provider. In some cases, a bank or other financial institution may offer the possibility of establishing a foreign currency account denominated in the foreign currency and into which the traveler may transfer funds from a base or home account denominated in traveler's home currency.

After leaving the foreign country and returning home, travelers typically have a small excess amount of cash or account funds in the foreign currency. Reconverting the foreign currency to a home currency may occasion a loss due to disadvantageous exchange rates, and often necessitates a visit to a bank or foreign currency house to effect the exchange. This leads to many travelers simply retaining the foreign currency as "dead money" that ends up having little or no usefulness, on the off chance they may return to the foreign country in the future.

BRIEF DESCRIPTION OF THE DRAWINGS

Embodiments are described in detail below, with reference to the following drawings:

FIGS. 10a to 10h shows example user interfaces displayed on a mobile device in connection with prompting a foreign currency transaction.

Like reference numerals are used in the drawings to denote like elements and features.

DETAILED DESCRIPTION OF VARIOUS EMBODIMENTS

Figure 1:
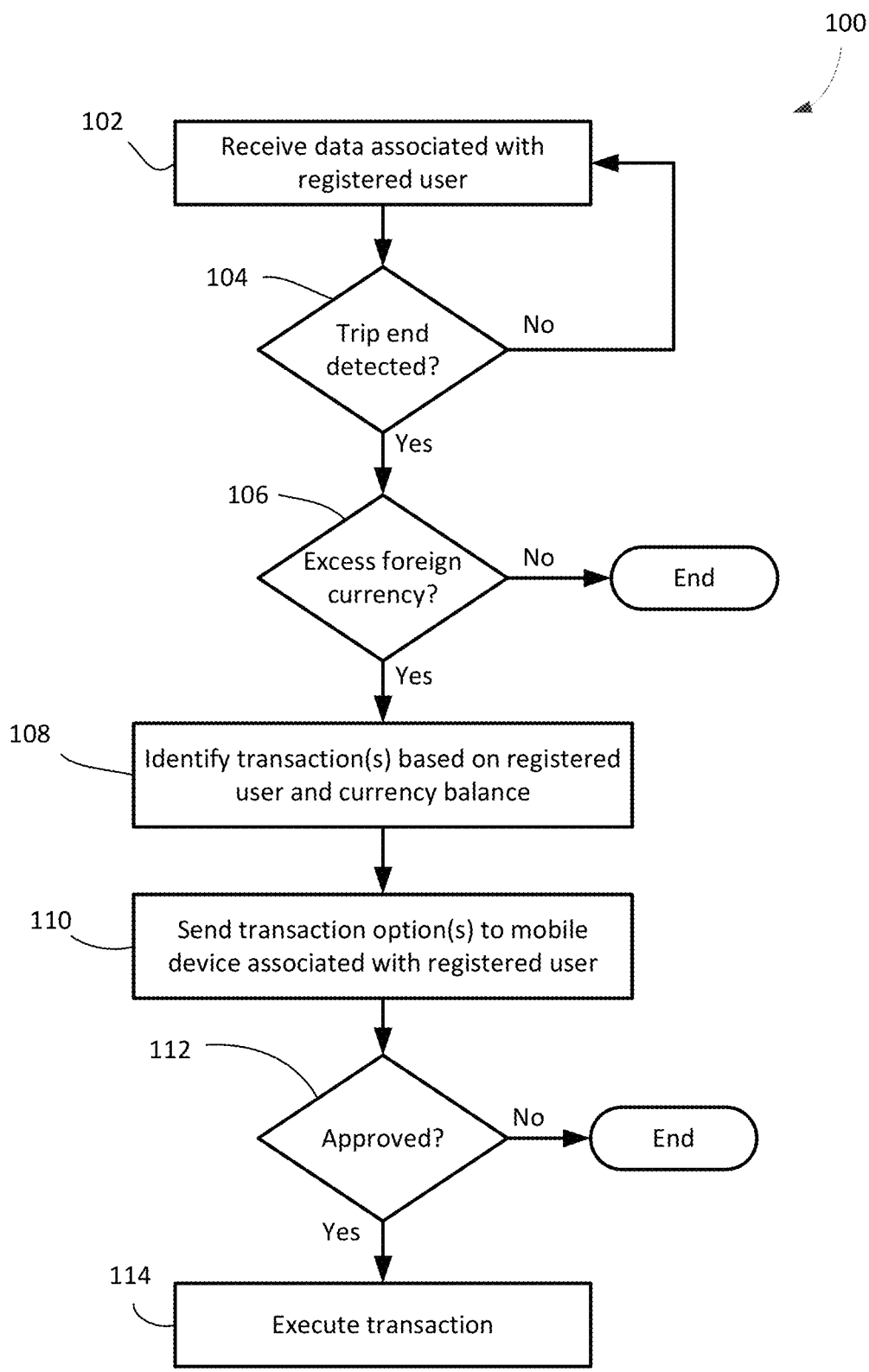
FIG. 1 shows, in flowchart form, an example method of prompting a foreign currency transaction.

In one aspect, the present application describes a method of automatically prompting a foreign currency transaction in connection with travel. The method may include detecting a trip end condition for a registered user with respect to a trip to a foreign location associated with a foreign currency different from a home currency; determining that a foreign currency account associated with the registered user has a remaining foreign currency balance; identifying at least one option for using the remaining foreign currency balance; and sending, via a network connection, a notification to a mobile device linked to the registered user, the notification providing the at least one option to expend the remaining foreign currency balance.

In some implementations, the at least one option, when actuated on the mobile device, results in receiving an instruction from the mobile device to initiate a transaction to use the remaining foreign current balance so as to empty the foreign currency account.

In some implementations, detecting the trip end condition is based on detecting a location of the mobile device, and wherein the location is associated with a departure event. In some cases, detecting the location may be based on receiving geolocation data from the mobile device, and the geolocation data may include one or more of global positioning data or WiFi location data.

In some implementations, detecting the trip end condition is based on detecting a transaction associated with the registered user with a merchant that is correlated to a departure event. In some cases, the transaction may include one or more of return of a rental car, purchase from an airport-located merchant, purchase from an international train station-located merchant, or payment of a baggage fee.

In some implementations, the method may include selecting a product offer based on the remaining foreign currency balance, the product offer being associated with a merchant at a departure location, and wherein the notification provides the product offer.

In some implementations, the at least one option includes converting the remaining foreign currency balance to another currency in another account associated with the registered user. The method may include determining a next destination country for the registered user, wherein the another currency includes a foreign currency associated with the next destination country. In some cases, the method may include identifying a second registered user having a second foreign currency account associated with the foreign currency, and wherein the at least option includes exchanging the remaining foreign current balance for another currency from an account associated with the second registered user. Identifying the second registered user may include detecting a trip start condition with respect to the second registered user for a trip to the foreign location. In some cases, detecting the trip start condition may include detecting a trip start event or a trip booking event with regard to the second registered user.

In another aspect, the present application describes computing device for automatically prompting a foreign currency transaction in connection with travel. The computing device may include a processor; a network connection coupled to the processor; a memory coupled to the processor and storing processor-executable instructions. When executed, the processor-executable instruction may cause the processor to detect a trip end condition for a registered user with respect to a trip to a foreign location associated with a foreign currency different from a home currency; determine that the registered user has an associated remaining foreign currency balance; identify at least one option for using the remaining foreign currency balance; and send, via the network connection, a notification to a mobile device linked to the registered user, the notification providing the at least option to expend the remaining foreign currency balance.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Travel to foreign countries often means traveling to a jurisdiction in which your home currency is not the currency in use. Although a travel may often use a globally-recognized credit card, such as a Visa™, Mastercard™, or American Express™ card, to purchase goods or pay for services, the exchange rate offered by the credit card company or the associated financial institution to convert foreign currency purchase into the traveler's home currency is usually disadvantageous and costly. Accordingly, when traveling to a foreign country, many travelers obtain local currency prior to travel or shortly after arriving in the foreign country to facilitate purchases while in the foreign country. In many cases, the traveler may obtain the foreign currency in the form of cash from a bank or other financial institution, or from a dedicated foreign exchange provider. In some cases, a bank or other financial institution may offer the possibility of establishing a foreign currency account denominated in the foreign currency and into which the traveler may transfer funds from a base or home account denominated in traveler's home currency. The foreign currency account may permit the traveler to withdraw foreign currency cash from local ATMs in the foreign country, or to make electronic transfers of foreign currency to others, such as through email money transfers for example. The exchange of home currency into foreign currency, whether in the form of cash or credit to a foreign currency account, obviously comes at a cost, but it may be less costly than simply relying on credit card exchange rates.

In many cases, a traveler will come to the end of a trip and will have excess foreign currency available, whether in cash or in a foreign currency account. Unless the country is one to which the traveler intends to return in the future, the traveler may to go to the effort of re-exchanging the foreign currency for home currency. This may involve locating and visiting a financial institution or dedicated currency exchange business to convert cash holdings, or instructing a financial institution to transfer and convert holdings in a foreign currency account to a home currency account. In some cases, particularly if the amount of the foreign currency is small, the effort of conducting the exchange and the exchange rate costs demotivate a traveler from exchanging foreign currency, resulting the traveler simply holding the foreign currency as "dead money".

Accordingly, it would be advantageous to provide for systems and methods to either avoid a disadvantageous exchange rate or avoid excess foreign currency sitting idle and unused. Implementation of such a system or method raises the issue of how and when to identify a traveler in need of foreign currency conversion and how and when to determine what do with excess currency.

In one aspect of the present application, methods and systems are described for automatically prompting a foreign currency transaction by detecting, by a server, a trip end condition associated with a registered user with respect to travel to a foreign location associated with a foreign currency different from a home currency associated with the registered user. The methods and system may further determine, through data stored at a server or data input by the registered user, that the registered user has a remaining foreign currency balance, and, as a result, may identify at least one option for using the remaining foreign currency balance. The server may send a mobile device linked to the user a notification that details the at least one option for using the foreign currency balance.

In one example, the at least one option may be a selectable offer from a merchant associated with the registered user's location. The selectable offer may be for a product or service priced to match the remaining foreign currency balance. When one of the offers is selected on the mobile device, the mobile device may notify the server, which may correspondingly notify the merchant. The server may provide the mobile device with a coupon, code, or other confirmation of the offer acceptance. In the case where the foreign currency is in a foreign currency account, the server may initiate a payment transaction with the merchant and may provide the mobile device with a confirmation of payment once payment from the foreign currency account is confirmed through a payment processor, enabling the mobile device user to retrieve the paid-for product or service from the merchant.

In another example, the at least one option may be an advantageous currency exchange option to a home currency or a next-country currency at a better-than-banking currency exchange rate. In some cases, the exchange may be with another registered user and facilitated by the server.

Detection of the trip end condition may be made using geolocation data and a database of international travel departure locations. International travel departure locations may include, for example, international airports, international train stations, ship ports, etc. That is, once the registered user's mobile device is determined to be in a foreign country having a foreign currency, then when the location of the mobile device is determined to be a departure location then the server may identify that as a "trip end condition" that triggers the determination of excess foreign currency balance and the identification of expenditure options and forwarding of those options to the mobile device. Geolocation data may be obtained from the mobile device. Example geolocation data includes global navigation satellite system (GNSS) (e.g. global positioning satellite (GPS)) determined geo-coordinates or readings. Other examples include WiFi or cellular based location data. In some cases, location of the device at a departure location may be inferred from transaction data available to the server from third party sources, such as credit card processing data, bank debit transaction data, third party merchant transaction data, airline or train check-in data or baggage fee transactions, or other such sources. Transactions relating to merchants located at or associated with the departure location may be used to infer the trip end condition. In some cases, a calendar or other user data may be used to determine the trip end condition, such as due to the schedule for a purchased flight. Combinations of two or more of these factors may be used to detect the trip end condition.

Reference will now be made to FIG. 1, which shows, in flowchart form, one simplified example method 100 of prompting a foreign currency transaction. The method 100 may be implemented by a suitably-programmed computing device with network connectivity. The computing device may be a server or a group of servers, in some cases. Memory within, or accessible to, the computing device may store computer-executable program instructions that, when executed by one or more processors within the computing device, cause the one or more processors to carry out the operations described. The computing device stores, or has access to a storage device that stores, data regarding registered users. The computing device is configured to receive communications from and/or send communications to a mobile device associated with one of the registered users.

In one example, the computing device may be implemented and operated by a financial institution. In such a case the data regarding registered users may include account data and other financial-related information pertaining to the registered user. In another example, the computing device may be implemented and operated by an administrator other than a financial institution, such as a third party app developer, without having access to any associated financial account data.

The mobile device may have a mobile application or other computer code installed thereon to facilitate communications with the computing device.

The method 100 is configured to determine when a registered user has excess foreign currency and to facilitate the expenditure or exchange of that excess foreign currency. The determination that foreign currency is "excess" may be made on the basis of an automated determination by the computing device that a foreign trip has ended or is about to end. Accordingly, the method 100 is based on first determining that the registered user is on a foreign trip. Such a determination may be based on a calendar item, geolocation data provided by the mobile device, transaction data with regard to foreign retailers, etc. Once the registered user is determined to be on a foreign trip in a location that uses a foreign currency, then the method 100 may be carried out to identify whether excess foreign currency is held.

The method 100 implemented at the computing device may include receiving data associated with the registered user in operation 102. The data may, in some cases, include geolocation data. The geolocation data may be provided by the mobile device in some cases. For example, the mobile device may relay global coordinates determined using a GNSS chip and satellite signals. In some cases, the mobile device may relay geolocation data determined using other techniques, such as using cellular data, WiFi data, or other such sources.

In some cases, the data received in operation 102 is not explicit location data. Instead, the data received may be data from which the computing device may determine the mobile device's likely location. For example, the data may include data regarding a WiFi router, Bluetooth™ beacon, or other such data obtained by the mobile device and relayed to the computing device. In some examples, the data may include a calendar entry relating to travel, an email or text message relating to travel, or a notification or other data from a travel-related application on the mobile device, such as an airline or train app.

In some cases, the data received in operation 102 is received from a source other than the mobile device. The data may include transaction data from which the location of the mobile device may be inferred. For example, the transaction data may include credit or debit-based purchases of goods or services and data indicating the merchant. Example transactions may include rental car payment or deposit return, purchase from a retailer at a specific location, or payment of a travel-related expense, such as an airline or train baggage fee.

The data received in operation 102 may be real-time data regarding the mobile device location or from which location might inferred, or it may be data received during or prior to the registered user's travel in some cases. For example, transaction data may be obtained regarding the booking of travel, such as from the user's calendar, a carrier mobile app, credit or debit card data, etc. In some cases, the data may be received as a result of the user entering the data into a dedicated foreign currency application on the mobile device. If transaction or scheduling data is obtained regarding the travel itinerary, then the computing device may store information regarding the user's travel plans, such as the train or flight numbers, date(s) and times of return flights, associated airport or train station, etc.

In operation 104, the computing device determines from the data received whether a trip end condition is detected. In some examples, detection of a trip end condition may be based on determining from the data, either directly or inferentially, that the registered user or the mobile device is at an international departure location. International departure locations may include, for example, an international airport, an international train station, an international port, or other such locations from which international travel routes depart. The international departure location may be a specific location that corresponds to a scheduled departure specified in the received data, such as a departure airport on a travel itinerary.

In some other examples, the detection of a trip end condition may be based on determining, from the data, either directly or inferentially, that the registered use has departed the foreign country. For example, the received data from operation 102 may include location data indicating that the mobile device or registered user is now located in a different country.

Having detected the trip end condition in operation 104, in operation 106 the computing device then determines whether the registered user has excess foreign currency. In some implementations, the computing device is operated by a financial institution through which the registered user has an established foreign currency account. In such implementations, data regarding the foreign currency balance may be obtained from a financial institution user account server. In some implementations, the computing device may be operated by a financial institution, but the foreign currency account may be held with a different financial institution. Using open banking protocols, the computing device may be configured to query a server at the different financial institution to obtain account balance data regarding the foreign currency account.

In some implementations, the computing device may be implemented without connection to a financial institution or access to foreign currency account data. In some implementations, the registered user may hold foreign currency in cash form instead of or in addition to having funds in a foreign currency account. Accordingly, the computing device may be configured to query the mobile device for input of a foreign currency total, confirmation of a foreign currency balance determined by the computing device, or editing/adjustment of a foreign currency balance determined by the computing device. The mobile device may present, using the mobile device interface, a notification or other display seeking the input, confirmation, and/or editing of the foreign currency balance. The mobile device then transmits user input to the computing device providing a foreign currency balance or confirming the foreign currency balance provided by the computing device.

Once the computing device determines the foreign currency balance, it may determine whether the balance is "excess". In some examples, any balance may be deemed "excess" once the trip end condition is detected. However, in some implementations only balances below a set threshold level may be deemed "excess" foreign currency, for example on the basis that the balance is too small for the registered user to consider holding in hopes of future opportunities for travel or to go to the trouble of converting to a home currency at an exchange location. In some implementations, only balances above a minimum threshold level may be deemed "excess", for example on the basis that a balance that is too trivially small is insufficient to justify continuation of the method 100.

If in operation 106 it is determined that the user has no remaining foreign currency, or the balance does not meet the threshold(s) for being "excess" foreign currency, then the method 100 may end. Otherwise, the method 100 continues to operation 108 in which the computing device identifies a transaction to expend or exchange the foreign currency balance. The transaction may be identified based on one or more factors. Example factors include the foreign currency balance, data regarding the registered user, the location of the registered user/mobile device, purchase history of the registered user, transaction preference data associated with the registered user, etc. In some cases, based on the location of the registered user, the computing device may identify one or more merchants at that location and, based on the foreign currency balance, may identify one or more products, services, vouchers or other items upon which the foreign currency balance may be expended. The merchants may be registered merchants with the computing device that have provided goods/services data, including pricing data. That data may be pre-specified and stored at the computing device, or may be obtained by the computing device through an API to interface with one or more computing systems associated with the merchants. In some cases, the registered merchants may have specified discount or incentive rules or threshold. For example, the computing device may be authorized to discount the regular price of goods by up to 5% so as to identify a transaction that matches the foreign currency balance.

In another example, as will be described in greater detail below, the computing device may identify an exchange transaction rather than a goods/services purchase transaction. The exchange transaction may be an exchange of the foreign currency balance to another currency at a selected exchange rate. The other currency may be a home currency in some cases. The other currency may be a third currency in some cases. The third currency may be identified by the computing device based on data regarding a next location in the user's travel itinerary, or based on location data received from the mobile device indicating the mobile device's current location in a third country. The exchange rate may be based on a current bank exchange rate, in some cases. In some examples, the exchange is a foreign currency transaction with the financial institution at prevailing bid/ask rates. In some examples, the exchange is a foreign currency exchange with another registered user.

In some examples, the transaction may be a donation transaction to one or more charitable options. In some cases, the registered user may have one or more loyalty points programs acceptable to one or more of the merchants, in which case options may be presented that incorporate partial payment using loyalty points where the excess foreign currency is insufficient to cover the merchant's minimum price for a product or service.

In operation 110, data regarding the identified transaction(s) is transmitted to the mobile device, where the mobile device presents the identified transaction(s) to the user on the display. The user may have the option of approving or selecting one of the identified transaction(s), as indicated by operation 112. In some cases, the approved transaction is carried out by the computing device to expend the foreign currency, as indicated by operation 114. This may include causing transfer of the foreign currency balance to a merchant account, or implementing the exchange with the financial institution or another registered user based on an exchange rate, for example. In some instances, acceptance of the transaction may result in the mobile device displaying a scannable voucher, coupon, QR code, or the like that the user may present to a particular merchant to obtain the good/service. In some cases, the transaction is carried out by the registered user by attending the merchant and presenting data regarding the identified transaction on the mobile device, where the transaction itself may be carried out by cash without involving the computing device.

Figure 2:
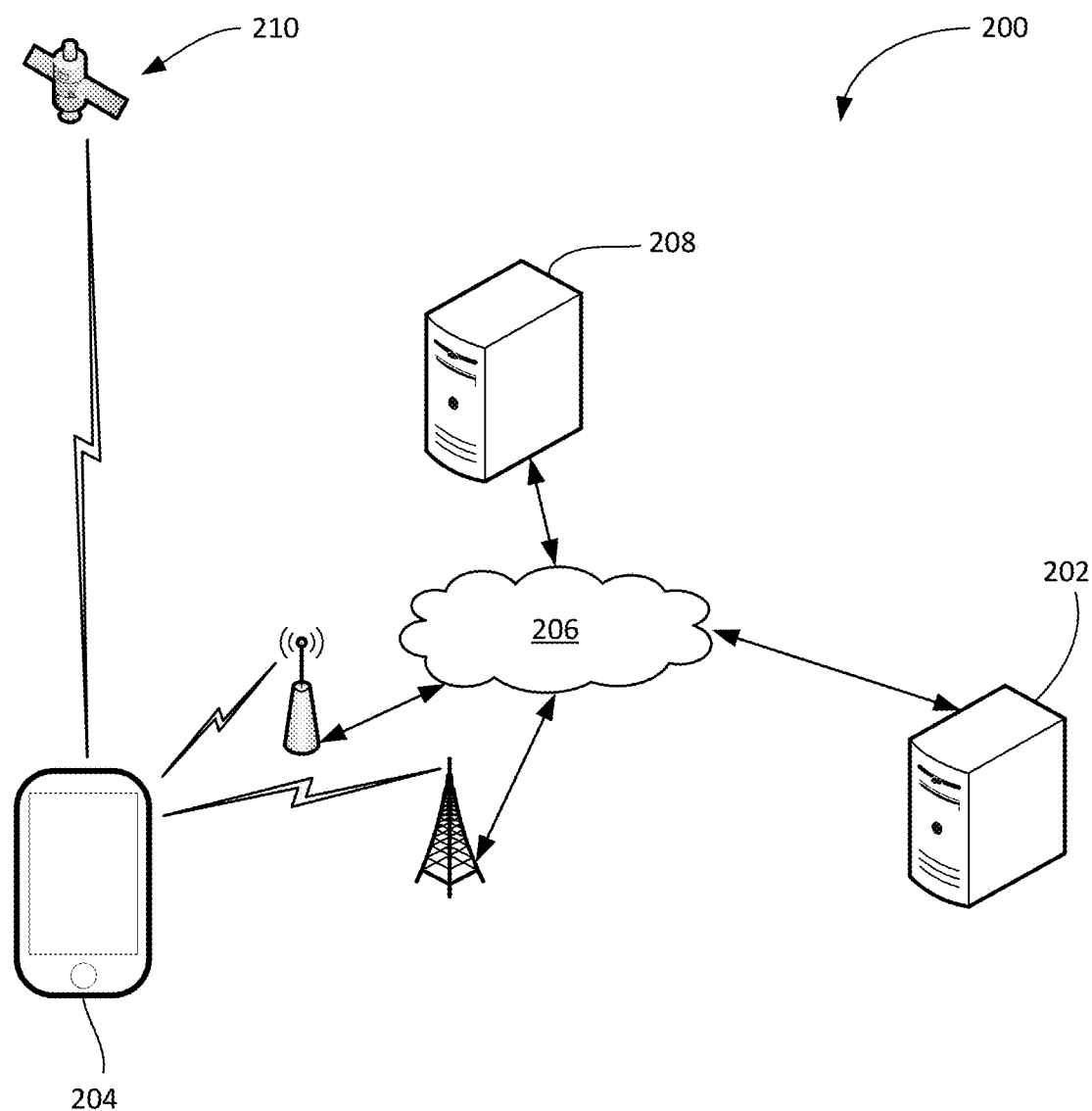
FIG. 2 is a simplified diagram of an example system for prompting foreign currency transactions.

Reference will now be made to FIG. 2, which shows a schematic diagram illustrating an example system 200 in accordance with one aspect of the present application. A server 202 and a remote wireless mobile device 204 communicate over a network 206. The remote wireless mobile device 204 may take a variety of forms, such as a smart phone, a tablet, a laptop, or other mobile computing device. The server 202 may be implemented using a variety of computing devices, which may include a suitably-programmed general purpose computing device. In some cases, the server 202 includes a plurality of computing devices. In some implementations, the server 202 is associated with a financial services enterprise, such as a bank, credit union, credit card company, etc.

The mobile device 204 may include a geolocation function, such as a Global Navigation Satellite System (GNSS) chip. Examples of GNSS include the Global Positioning System (GPS), the BeiDou Navigation System (BDS), and the Galileo system. The mobile device 204 may receive broadcast GNSS signals from a plurality of satellites 210, from which the GNSS chip may determine the terrestrial location of the mobile device 204.

In some cases, the mobile device 204 also or alternative includes a non-satellite based geolocation function. One example relies on cellular tower signals and IDs. Another example relies on WiFi signals and IDs, or Bluetooth™ beacons. Other techniques for geolocation may also be used for some implementations.

The mobile device 204 may be configured to transmit geolocation data to the server 202 over the network 206. The geolocation data may be sent periodically, in response to detection of a trigger event at the mobile device 204, such as detection of more than a threshold change in location or identification of a geofence boundary event, or in reply to a polling message from the server 202. The mobile device 204 may be configured to transmit the geolocation data to the server 202 based on enrolment of the mobile device 204 as a registered device with the server 202. The mobile device 204 send other data to the server 202, such as transaction data. The server 202 may send data to the mobile device 204, such as identified transaction data for expending or exchanging a foreign currency balance, for example.

In one example implementation, the server 202 is associated with a financial institution and a registered user of the financial institution operates the mobile device 204. The registered user may have one or more accounts with the financial institution, such as a bank account, line of credit, credit card, credit facility, investment account, or the like. In some examples, the accounts include a foreign currency account. Accordingly, the server 202 may have a user record stored in a data store and containing details of the registered user and the registered user's associated accounts. The details regarding the registered user may include contact details, such as a name, username, phone number, email address, social media handle, etc. The user record may further include data regarding the mobile device 204, which may include a phone number, an international mobile subscriber identity (IMSI), a device identifier, MAC address, etc. The user record may further include ephemeral data regarding the mobile device 204, such as an IP address or the like.

The mobile device 204 may have installed thereon an application or other software module configured to send and receive data with the server 202. In some examples, the application may be a mobile app associated with the financial institution, e.g. a banking app, through which the mobile device 204 may access data stored on the server 202 regarding the registered user's accounts, balances, etc., subject to verification and authentication prerequisites. The banking app may enable the performance of transfers, purchases, divestments, or other such operations. The banking app may further be configured to relay geolocation data from the mobile device 204 to the server 202.

The geolocation data may be used by the server 202 to detect a trip end condition. The trip end condition may be detected based on determining that the mobile device 204 is at an international departure location.

Data from which the user's location is determined may be in the form of direction location data, e.g. coordinate location, or may be indirect data from which location may be inferred, such as data regarding a transaction with a specific merchant located at the international departure location. The data may come from the mobile device 204, or may come from a third party data source 208, such as a server or a data service to which the server 202 may subscribe to obtain data from which location may be determined.

The network 206 may be formed of one or more interconnected computer networks. For example, the network 206 may be or may include an Ethernet network, an asynchronous transfer mode (ATM) network, a wireless wide area network (WWAN), a wireless local area network (WLAN), or the like. The network 206 may, in some embodiments, include a plurality of distinct networks. For example, communications between certain of the computer devices may be over a private network whereas communications between other of the computer devices may be over a public network, such as the Internet. In some cases, communications may use both private and public networks for different legs of a communication path. Various authentication, encryption, and other privacy-protection measures may be employed to secure the communications and prevent fraudulent or malicious communications.

Figure 3:
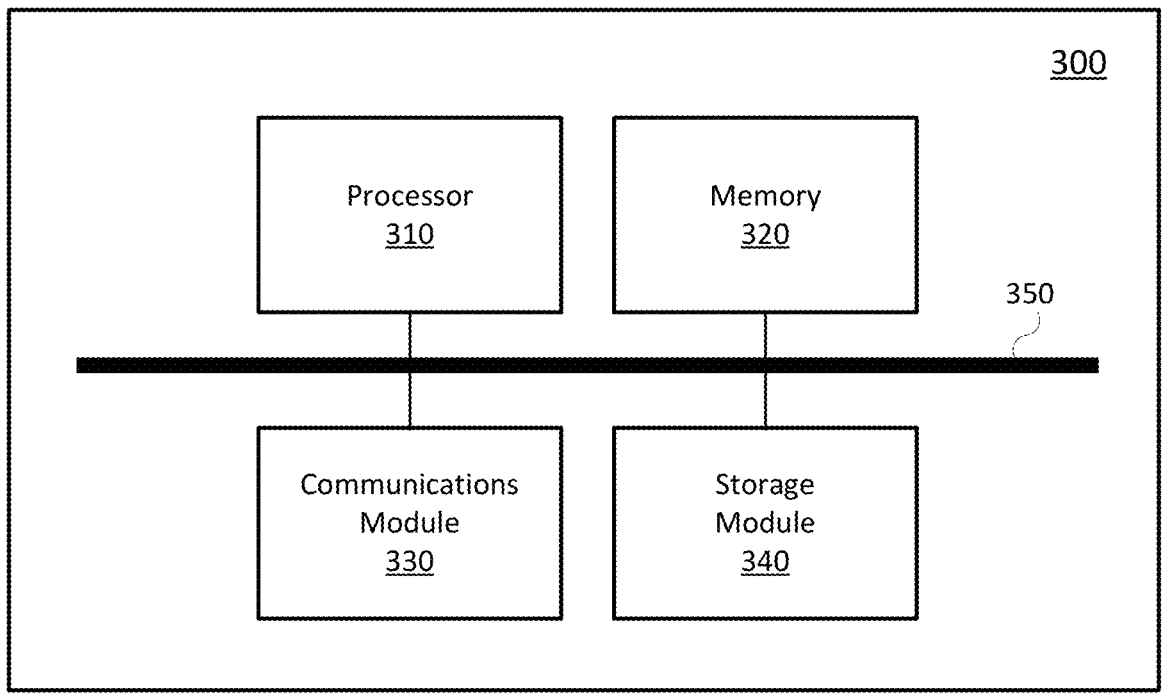
FIG. 3 is high-level schematic diagram of a computing device.

Referring now to FIG. 3, a high-level operation diagram of an example computing device 300 will now be described. The example computing device 300 may be exemplary of the server 202 or the mobile device 204.

The example computing device 300 includes numerous different modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 330 may allow the example computing device 300 to communicate using near-field communication (NFC), via WiFi, using Bluetooth™, or via some combination of one or more networks or protocols. In some embodiments, all or a portion of the communications module 330 may be integrated into a component of the example computing device 300. For example, the communications module 330 may be integrated into a communications chipset.

The storage module 340 allows the example computing device 300 to store and retrieve data. In some embodiments, the storage module 340 may be formed as a part of the memory 320 and/or may be used to access all or a portion of the memory 320. Additionally, or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally, or alternatively, the storage module 340 may access data stored remotely such as, for example, as may be accessed using a WLAN, WWAN, personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software instructions may be executed by the processor 310 from a computer-readable medium. For example, software may be loaded into random-access memory from persistent storage of the memory 320. Additionally, or alternatively, instructions may be executed by the processor 310 directly from read-only memory of the memory 320.

The computing device 300 may include other components apart from those illustrated in FIG. 3 and the specific component set may differ based on whether the computing device 300 is operating as the server 202 or the mobile device 204. For example, the computing device 300 may include one or more input modules, which may be in communication with the processor 310 (e.g., over the bus 350). The input modules may take various forms including, for example, a mouse, a microphone, a camera, a touchscreen overlay, a button, a sensor, etc. By way of further example, the computing devices 300 may include one or more output modules, which may be in communication with the processor 310 (e.g., over the bus 350). The output modules include one or more display modules which may be of various types including, for example, liquid crystal displays (LCD), light emitting diode displays (LED), cathode ray tube (CRT) displays, etc. By way of further example, the output modules may include a speaker.

Figure 4:
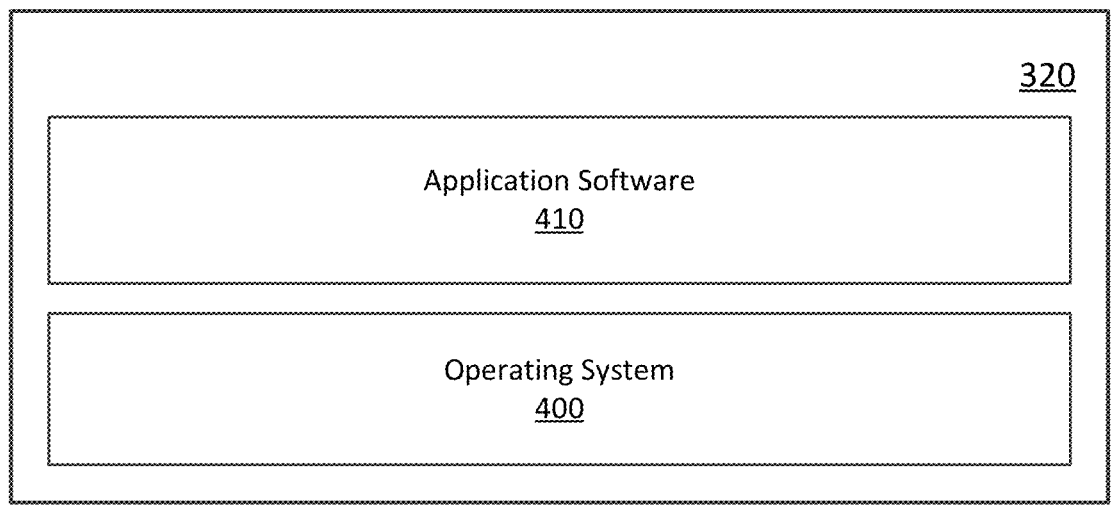
FIG. 4 shows a simplified organization of software components stored in a memory of the computing device of FIG. 3.

FIG. 4 depicts a simplified organization of software components stored in the memory 320 of the example computing device 300 (FIG. 2). As illustrated, these software components include an operating system 400 and an application software 410.

The operating system 400 is software. The operating system 400 allows the application software 410 to access the processor 310 (FIG. 2), the memory 320, and the communications module 330 of the example computing device 300 (FIG. 2). The operating system 400 may be, for example, Google™ Android™, Apple™ iOS™, UNIX™, Linux™, Microsoft™ Windows™, Apple OSX™ or the like.

The application software 410 adapts the example computing device 300, in combination with the operating system 400, to operate as a device performing a particular function. For example, the application software 410 may cooperate with the operating system 400 to adapt a suitable embodiment of the example computing device 300 to operate as the server 202 or the mobile device 204.

While a single application software 410 is illustrated in FIG. 4, in operation the memory 320 may include more than one application software 410 and different application software 410 may perform different operations.

As noted above, the present application detects a trip end condition and, once detected, identifies if the registered user has an associated excess foreign currency balance and, if so, then identifies and sends a foreign currency expenditure or conversion option to the registered user's mobile device. Detection of the trip end condition may be based on receiving direct location coordinate data from the mobile device and determining that the mobile device is located in at an international departure location in some cases. In some cases, the trip end condition may be detected based on inferring location from associated data, such as transaction data that is associated with an international departure location, for example. In some cases, the trip end condition may be detected based on a planned or scheduled departure. In yet other cases, some combination of these factors may be used to detect a trip end condition.

Figure 5:
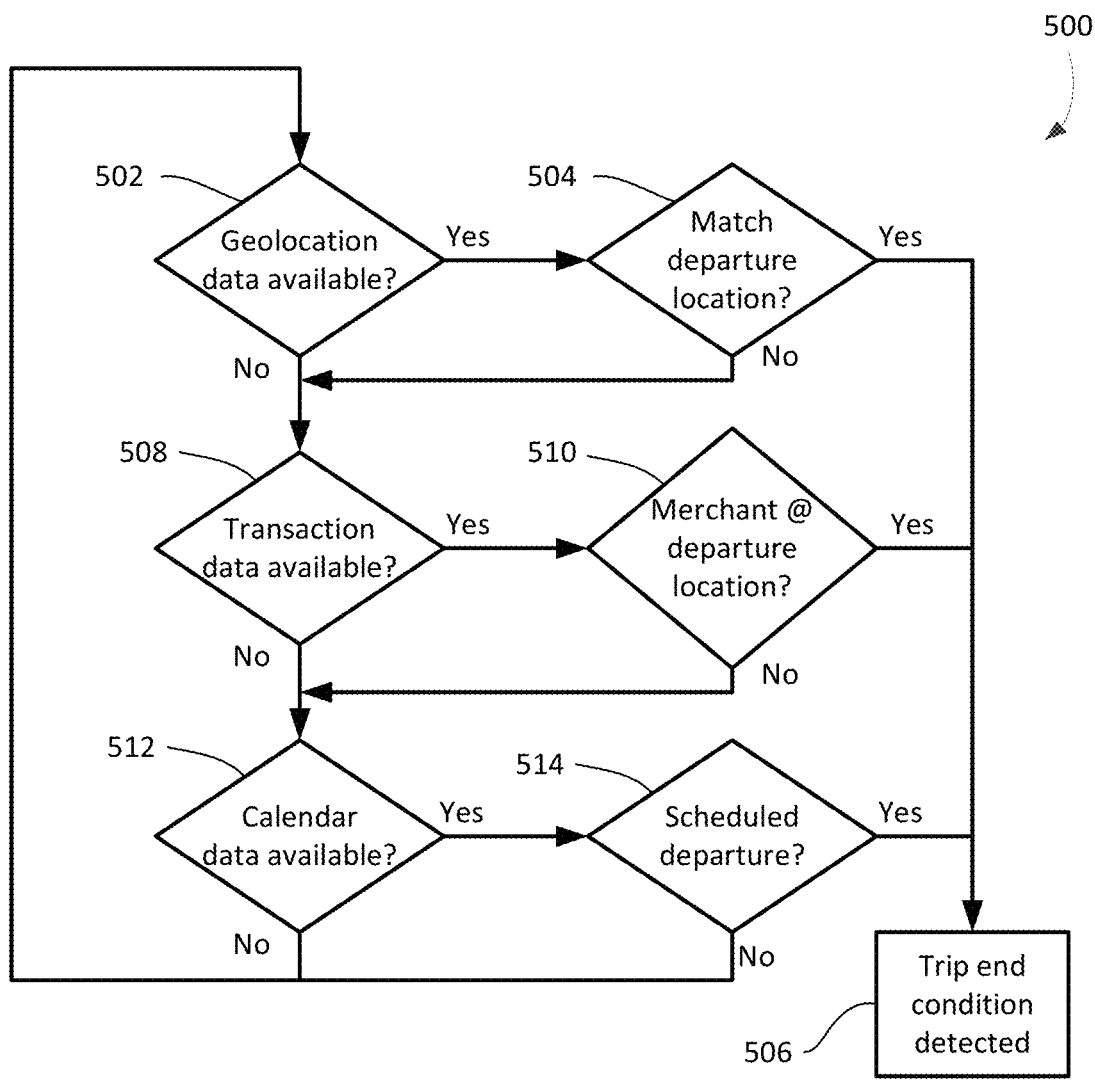
FIG. 5 shows, in flowchart form, an example method for detecting a trip end condition.

FIG. 5 shows, in flowchart form, one example method 500 of detecting a trip end condition with respect to a registered user's travel to a foreign location. The method 500 may be implemented by way of software executed by a computing device, such as one the computing devices described above. In some cases, the trip end condition may be detected by a mobile device associated with the user and existence of the trip end condition may then be reported to a remote server. In some cases, the trip end condition may be detected by the remote server based on data relayed by the mobile device or based on data from a third party source, or combination thereof. References to the computing device below may refer to the remote server or to the mobile device.

The method 500, in this example, may use geolocation data, transaction data, or schedule data. In operation 502, the computing device implementing the method 500 determines whether geolocation data is available with respect to the mobile device. In some cases, a registered user may disable location data functions on a mobile device while traveling due to roaming data charges or for other reasons, making geolocation data unavailable. In some cases, satellite-based geolocation data may be unavailable due to the user's location.

If geolocation data is available, then in operation 504, the computing device determines whether the geolocation data indicates that the mobile device is located at an international departure location. The computing device may have a predetermined list of international departure locations for the foreign country, in some cases, such as geographic data for a list of international airports. In some cases, the geographic data defines a geofence with respect to the international terminal of an airport or other such departure location.

In some cases, the geolocation data may be location data other than satellite-based geographic coordinate data. For example, in some instances, location may be determined by the mobile device using cellular data, WiFi data, Bluetooth™ beacon data, etc. This data may or may not be sufficiently specific enough to identify the mobile device as being located at an international departure location in operation 504.

If the geolocation data is sufficient to determine that the mobile device is located at an international departure location in operation 504, then in operation 506 the trip end condition is detected.

If geolocation data is unavailable or does not indicate a trip end condition, then in operation 508 the computing device assesses whether transaction data is available. The transaction data may include purchase transaction data from a mobile wallet or banking app on the mobile device, from a credit card processor, from a banking server providing debit card payment services, or from a third-party payment source such as PayPal™ or Stripe™, for example. The transaction data may include a type of transaction and/or a merchant identifier. In some cases, the transaction data may indicate a merchant location. If no location is available, the merchant identifier and/or other transaction data may be used to determine the merchant location.

In some cases, the transaction data may be sufficiently associated with an international departure location to determine that the trip end condition has been detected, as indicated by operation 510. For example, a baggage fee payment transaction at an airport, a retail purchase from a retailer located at an airport or international train station, an on-board purchase on an airplane, a deposit refund or payment transaction indicative of return of a rental car to a rental car location at the airport and/or train station, a taxi or ride-share transaction with destination data corresponding to the international departure location, or the like. If the transaction data is sufficiently specific to place the registered user or the mobile device at the international departure location, then the trip end condition is considered detected in operation 506.

The method 500 may further involved determining whether schedule data is available, as indicated by operation 512. Schedule data may include user calendar data, itinerary data from a third party app such as an airline or travel application, departure data from a prior ticket purchase, or the like. In operation 514, the computing device assesses whether the schedule data indicates a trip end condition; that is, whether the current time and data correspond to a scheduled international departure window of time. For instance, 3 to 4 hours prior to a scheduled departure flight. Schedules may be adjusted based on data from airports or airlines regarding delayed or cancelled flights, in some cases. If the schedule data indicates that an international departure is scheduled to occur with respect to the registered user, then the method 500 proceeds to operation 506 and the trip end condition is considered detected.

It will be appreciated that in some implementations, the geolocation data, the transaction data, and the schedule data may be considered in combination to determine whether a trip end condition is met. That is, the combination of data may be used to determine a confidence level in whether the registered user is at an international departure location. Geolocation data from GNSS signals may give very high confidence of location; whereas, transaction data or other inferred-location data may only provide a modest level of confidence in location; however, if transaction data indicates the user is likely at a departure location and schedule data indicates that a departure is likely, then the resulting confidence measurement may be sufficient to find that the trip end condition is met.

In the above examples, the "location" corresponding to the trip end condition is an international departure location and/or departing international flight/train. In some other examples, the "location" corresponding to the trip end condition may be detection of the mobile device and/or registered user's location in a different foreign country, e.g. after arrival. Similar data sources may be used to detect such a change, including attachment of the mobile device to a new mobile device network corresponding to the new country. It will be appreciated that if the trip end condition is only detected after arrival in the new country, then the available options for expenditure or conversion of the excess foreign currency may be more restricted.

Figure 6:
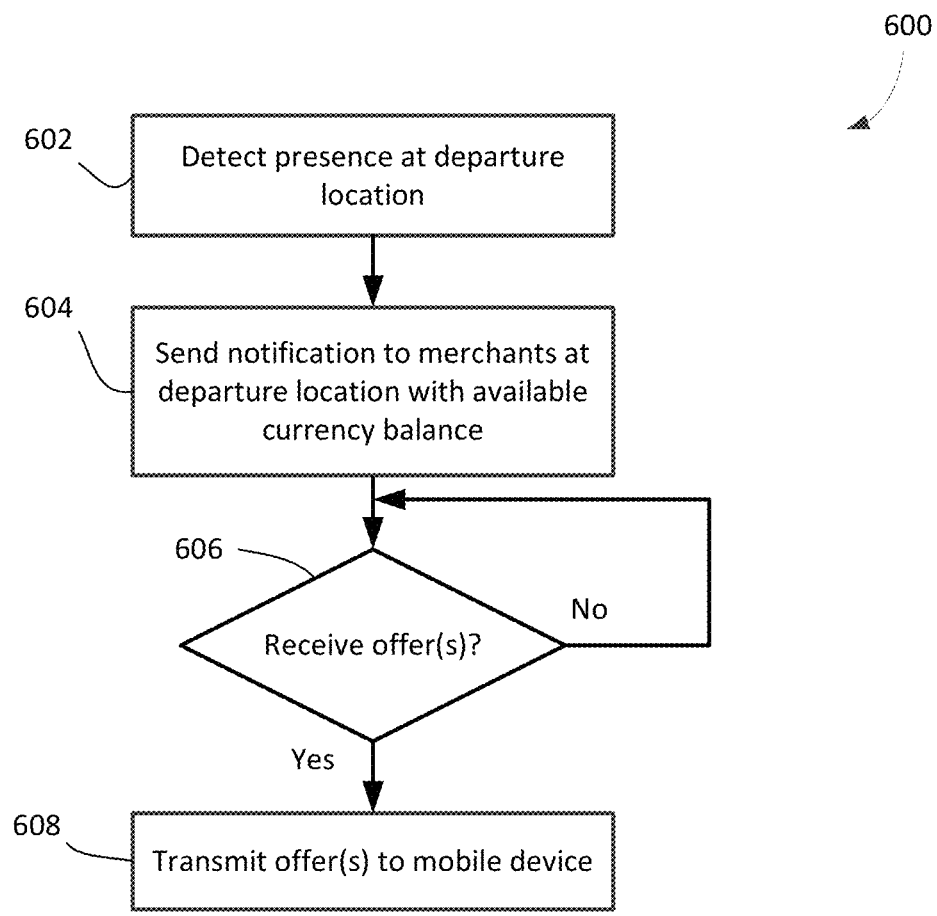
FIG. 6 shows, in flowchart form, an example method of generating and providing foreign currency expenditure options.

FIG. 6 shows, in flowchart form, one example method 600 of prompting a foreign currency transaction. The method 600 may be implemented by a computing device, as described above, and may be carried out in connection with first determining that a registered user is traveling in a foreign country that uses a foreign currency. In operation 602, the computing device determines that the registered user is present at an international departure location. The determination may be based on any one or more of a number of factors, as described in connection with FIG. 5. Operation 602 corresponds to detection of a trip end condition, which in this case is based on determining that the registered user and/or the user's mobile device is located at an international departure location. Operation 602 may further include determining an excess foreign currency balance. The determination may be based on stored data regarding the user's foreign currency account, or may be obtained through soliciting data form the user via the mobile device regarding the registered user's excess foreign currency holdings, or both.

In operation 604, the computing device notifies merchants located at the departure location regarding the registered user's excess foreign currency. In some implementations, the notification may specify the excess foreign currency balance. That is, the merchants at the departure location may be notified that a registered user is present that has a certain quantity of foreign currency to expend. In response, the computing device may receive one or more offer messages from the merchants in operation 606. The offer messages may include specified goods, services, discounts, etc., available to the registered user. In some cases, the offer messages are restricted to goods or services that may be purchased for the specific excess foreign currency balance, thereby ensuring it is expended exactly. Those offers may then be relayed to the user's mobile device, as indicated by operation 608. The user may accept one of the offers, for example through the mobile device or by presenting the displayed offer to the retailer location. In this sense, the merchants may "bid" on the registered user's remaining excess foreign currency through presenting discounted offers of goods or services that will suffice to exhaust the excess foreign currency.

Figure 7:
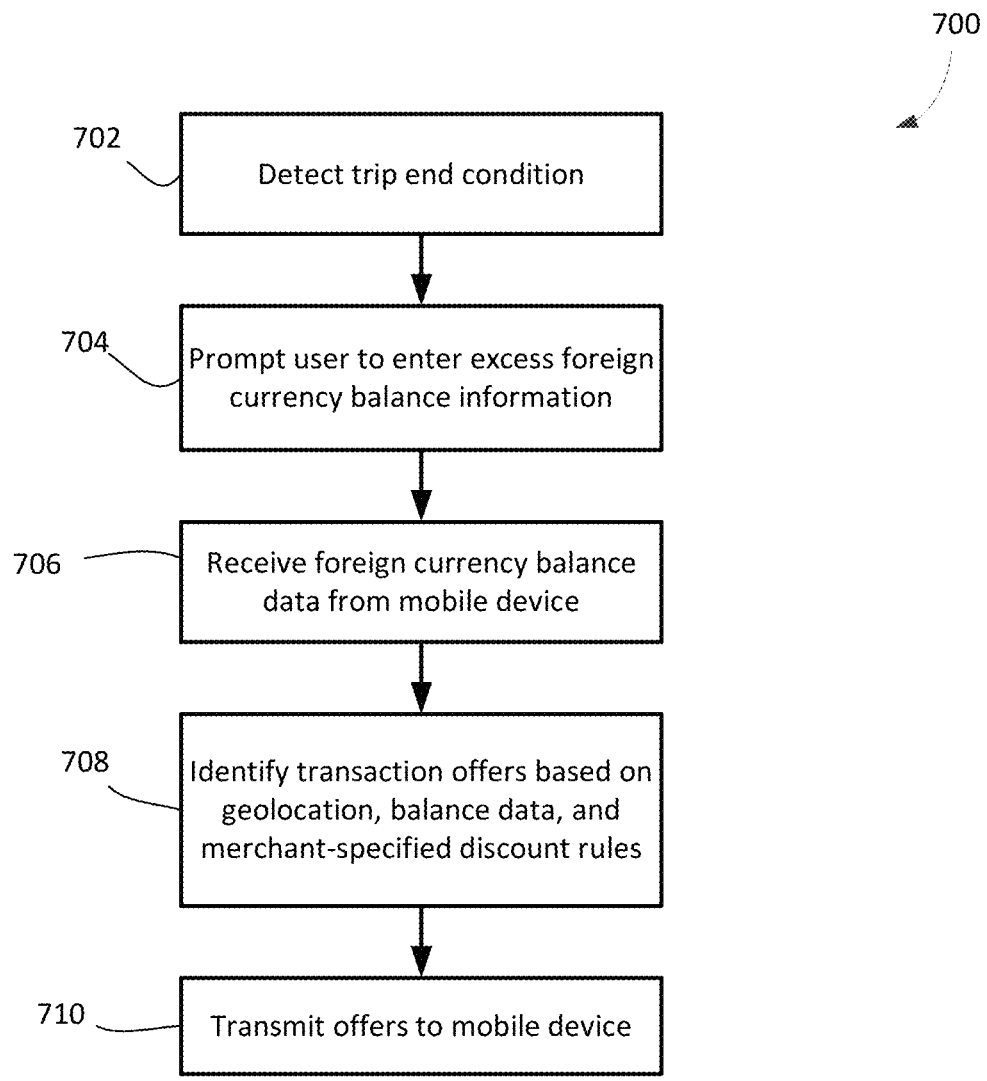
FIG. 7 shows, in flowchart form, another example method of generating and providing foreign currency expenditure options.

FIG. 7 shows another example method 700 of prompting a foreign currency transaction. In this example, the computing device detects a trip end condition in operation 702. The trip end condition may include determining that the location of the user and/or mobile device corresponds to an international departure location, in some cases.

In this example, in operation 704, the computing device may notify the mobile device, causing the mobile device to prompt the registered user to enter an excess foreign currency balance. The excess foreign currency balance may be based on the cash holdings of the registered user, in some cases. The computing device then receives this data from the mobile device in operation 706. In operation 708, the computing device identifies one or more transaction offers for expenditure of the excess foreign currency. The identification of the one or more transaction offers may be based, in part, on the location of the registered user and/or mobile device. That is the transaction offers may be specific to merchants co-located with the mobile device and/or registered user, e.g. at the international departure location. In some cases, the co-location may be specific to an international departure terminal, or proximate a specific departure gate.

In some cases, identification of the one or more transaction offers may be based, in part, on the excess foreign currency balance specified by the registered user and one or more merchant-specified discount rules. That is, the merchants may be registered with the computing device such that the computing device stores or has access to data on the merchant's products, services, and pricing. The merchants, on registration, may further provide or select discount rules. For example, that certain products and/or types of products or classes of services may be discounted by up to X % in generating an offer. In that manner, the computing device may identify products or services that are priced so as to use the excess foreign currency balance.

To illustrate by example, if a registered user's excess foreign currency balance is $42.20 Canadian dollars, then the computing device may be configured to identify goods and services from the local merchants that may be offered to the user to expend $42.20. This may include a single good/service or a combination of goods/services that total $42.20. Merchant rules may specify a permitted discount of up to a set amount or a percentage amount. As an example, a clothing store may permit discounts of up to 20% on clothing merchandise. Accordingly, the computing device may identify any inventory available at that merchant with pricing between $42.20 and $52.75. The identified item(s) may then each be offered to the user for $42.20 Canadian dollars. Accordingly, the computing device may identify one or more offers from one or more merchants and may transmit those offers to the mobile device in operation 710.

The mobile device then displays those offers to the registered user to enable them to select one, if desired. In some cases, the display may show the discount obtained with respect to each offer.

In some cases, identification of the one or more transaction offers may further be based on registered user data. The registered user data may provide information regarding types of products and/or services likely to be of interest to the registered user. The registered user data may include past transaction data, in some cases. In the registered user data may include social media data, such as likes, favorites, following data, or other indicia of affinity for a brand or product or class of goods or services.

Figure 8:
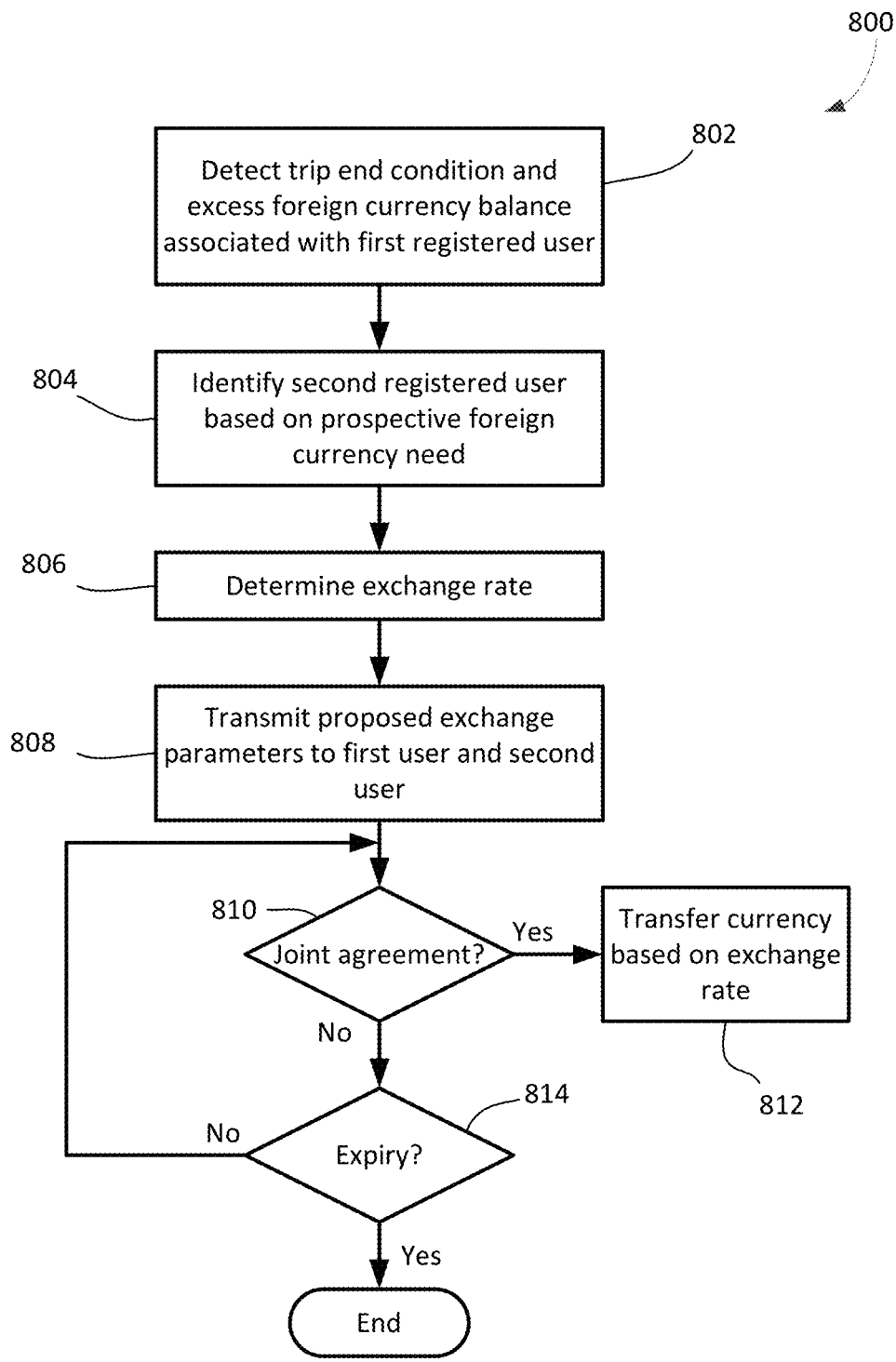
FIG. 8 shows, in flowchart form, an example method of generating a foreign currency exchange transaction.

Reference will now be made to FIG. 8, which shows, in flowchart form, an example method 800 of generating a foreign currency exchange.

In operation 802, a computing device, such as a server, detects a trip end condition and obtains an excess foreign currency balance in association with a first registered user. The trip end condition may be determined by the computing device based on any one or more of the above-discussed factors and data sources, including, for example, geolocation data from the associated mobile device. In some cases, the trip end condition is determined by the mobile device and reported to the computing device. In some cases, the trip end condition is detected based on a user input received on the mobile device specifying a trip end. The excess foreign currency balance is a balance in a foreign currency account to which the computing device has access. The computing device may be a server within a financial institution computer network with access to registered user account data, including the foreign currency account. The computing device may be an application server associated with a foreign currency application on the mobile device and managing foreign currency accounts on behalf of the registered users of the foreign currency application, which may or may not be associated with or controlled by a financial institution.

In operation 804, the computing device identifies a second registered user. The identification of the second registered user may be based on a prospective currency need; that it, the second registered user may wish to obtain the foreign currency. The computing device may identify the second registered user based on a pre-specified need for the foreign currency. In other words, the second registered may have previously indicated an interest in acquiring the foreign currency. In some cases, the computing device may identify the second registered user based on second registered user data indicative of a prospective trip to the foreign country. The second registered user data may include data regarding the purchase of airline or train tickets, data regarding a hotel or other accommodation booking in the foreign country, data regarding the purchase of event tickets, park passes, or other local bookings in the foreign country, a calendar item regarding travel to the foreign country, previous purchase or exchange to acquire the foreign currency, or other data indicative of upcoming travel to the foreign country.

In some cases, the computing device may identify the second registered user based on location data for the second registered user. That is, the computing device may identify a trip commencement condition indicative of the second registered user's travel to the foreign country. The trip commencement condition may be based on geolocation data indicating arrival in the foreign country, cellular or WiFi data indicating arrival in the foreign country, or transaction data associated with purchases or other transactions in the foreign country.

Identification of the second registered user may include accessing a currency account associated with the second registered user to confirm the currency account holds a balance sufficient to purchase the excess foreign currency balance. In some cases, the currency account may be in a "home" currency for either or both of the first or second registered users, but in some cases, the currency may be a third currency different from the first user's home currency and from the foreign currency—for example, if the first registered user is traveling from the foreign country to another foreign country instead of returning home, thereby permitting the first registered user to seamlessly exchange excess foreign currency for new foreign currency that corresponds to that user's next destination.

Once the second registered user is identified as having a prospective currency need for the foreign currency, then in operation 806 the computing device determines an exchange rate. The exchange rate may be a rate selected at which the second registered user is to exchange one currency for the excess foreign currency held by the first registered user. The exchange rate may be selected to be advantageous to both users over existing bid/ask exchange rates available for bank or foreign currency house exchanges. In some cases, the exchange rate may incorporate a small fee or spread. The computing device may receive real-time exchange rate data from one or more third-party servers for the purpose of determining the exchange rate.

Having determined an exchange rate in operation 806, the computing device then generates and sends a proposed exchange notification to the first registered user and the second registered user. The notification may be sent to mobile devices associated with each of the first and second registered users; in some cases, by way of text message, email, social media message, instant message, or pop-up notification from a foreign currency mobile application.

As indicate by operation 810, if both the first registered user and the second registered user return, via their respective mobile devices, affirmative acceptance of the proposed exchange to the computing device, then in operation 812 the computing device effect the exchange. This may include debiting the foreign currency account of the first registered user of its remaining balance and crediting a corresponding foreign currency account associated with the second registered user. At the same time, another currency account associated with the second registered user is debited of an amount determined by the exchange rate and those funds are credited to a currency account associated with the first registered user. In some cases, the exchange may be effected and recorded using blockchain technology.

If both users do not confirm, within an expiry time as indicated by operation 814, the proposed exchange transaction may be cancelled.

Figure 9:
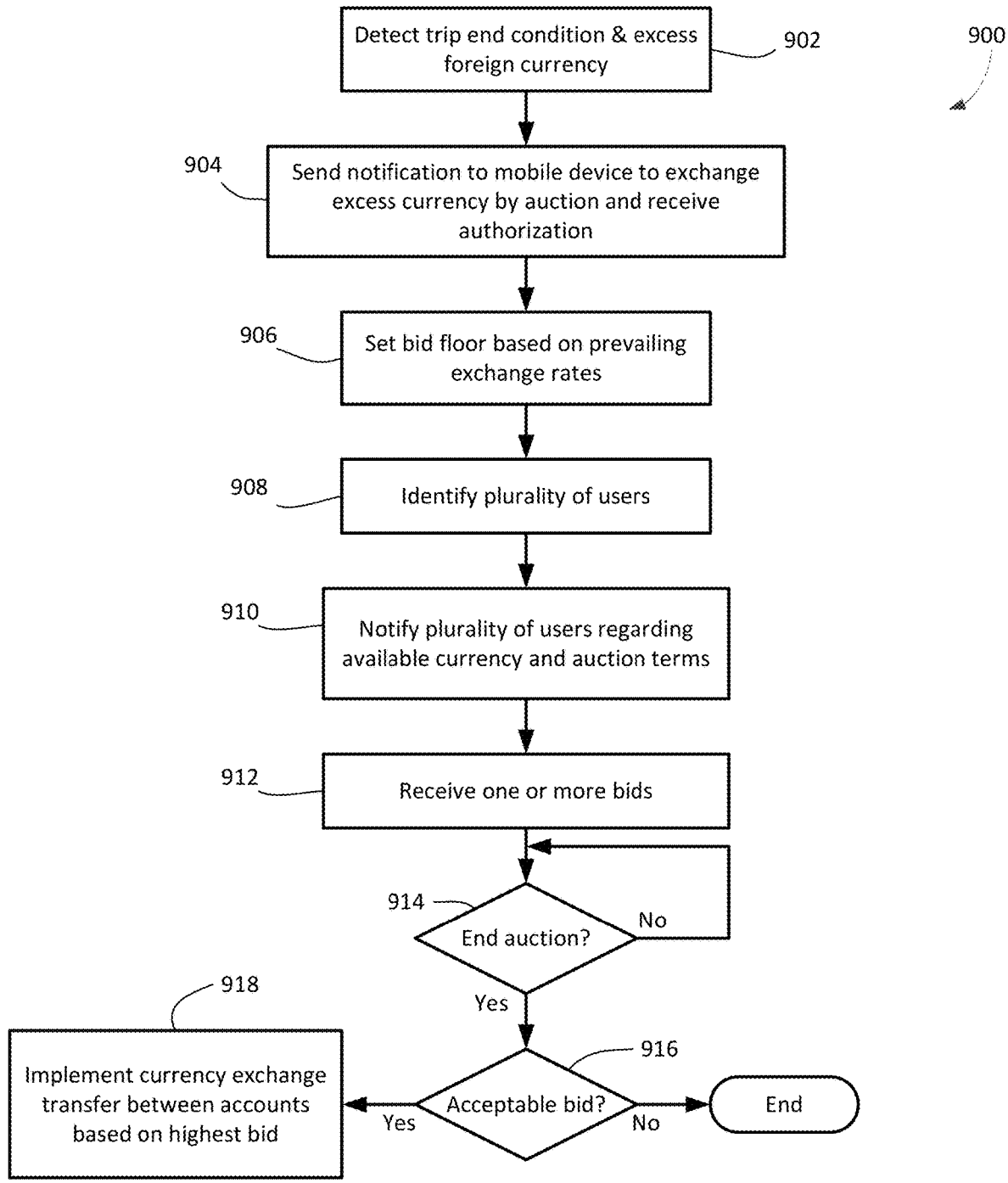
FIG. 9 shows, in flowchart form, an example method of generating and conducting a foreign currency exchange auction.

In some implementations, the detection of a trip end condition and excess foreign currency may prompt generation of a foreign currency auction. FIG. 9 shows, in flowchart form, one example method 900 for generating a foreign currency auction. The method 900 may be implemented by a computing device with a plurality of registered users, each of which has associated accounts in one or more currencies.

In operation 902, the computing device detects a trip end condition and obtains an excess foreign currency balance in association with a first registered user. The trip end condition may be determined by the computing device based on any one or more of the above-discussed factors and data sources, including, for example, geolocation data from the associated mobile device. In some cases, the trip end condition is determined by the mobile device and reported to the computing device. In some cases, the trip end condition is detected based on a user input received on the mobile device specifying a trip end. The excess foreign currency balance is a balance in a foreign currency account to which the computing device has access. The computing device may be a server within a financial institution computer network with access to registered user account data, including the foreign currency account. The computing device may be an application server associated with a foreign currency application on the mobile device and managing foreign currency accounts on behalf of the registered users of the foreign currency application, which may or may not be associated with or controlled by a financial institution.

In operation 904, the computing device then sends a notification to the mobile device. The notification causes the mobile device to display an auction offer on the display screen. The auction offer displayed may permit the user to approve or refuse the auction offer and, in some cases, may permit the user to enter a bid floor value. In some cases, the auction offer notification sent from the computing device includes bid/ask exchange data, which may be obtained from third-party data sources. The bid floor may be set to a default value of the prevailing bid value determined from third-party data sources. In some cases, the mobile device permits the user to edit the bid floor to increase it. In some cases, the bid floor may be increased up to but not exceeding the prevailing ask value determined from third-party data sources.

In some cases, the auction offer notification sent to the mobile device may default to conversion to the first user's home currency. In some cases, the user may be permitted to select a different currency to which the excess foreign currency is to be converted. A change in the currency selected may result in signaling from the mobile device to the computing device, the computing device obtaining new bid/ask data and exchange rate specifics, and a modified auction offer notification.

A response may be transmitted from the mobile device to the computing device confirming authorization for the auction and setting or confirming the bid floor, as indicated by operation 906. If the currency is changeable, then the response may confirm the currency to which the excess foreign currency is to be converted. Based on the authorization, the computing device may identify a plurality of registered users. The plurality of registered users may, in some cases, be identified based on them having an account in the currency to which the excess foreign currency is to be converted. They may be further identified based on that account having a balance sufficient to purchase the excess foreign currency. They may be further identified based on them having an account denominated in the foreign currency into which the excess foreign currency can be deposited if successful. Finally, they may be further identified based on them have a prospective need for the foreign currency, as discussed above in connection with FIG. 8.

Once the plurality of users is identified in operation 908, then in operation 910 the computing device transmits an auction notification to a respective mobile device associated with each of the plurality of users. The auction notification may specify auction terms and an expiry time or date. The auction terms may include the quantity of the excess foreign currency and a bid floor value. In response, the respective mobile device may be configured to display an alert or notification regarding the initiation of the auction and its terms. The respective users may be permitted, through the displayed interface on their respective mobile device, to select a bid value or bid exchange rate and to submit/confirm that bid. They may also be permitted to dismiss or refuse the auction. The interface may be generated by respective foreign currency mobile applications on the mobile devices.

In operation 912, the computing device receives one or more bids from the mobile devices of the plurality of users. If the auction time/date expires, as indicated in operation 914, then in operation 916 the computing device determines whether any of the submitted bids is acceptable. In some cases, bids may be permitted that are below the bid floor, in which case they may still be presented to the user as an optional acceptance, but not necessarily automatically accepted. In other cases, where the bid floor is a hard floor, only bids above the bid floor are permitted, so any received bid is an acceptable bid and operation 916 devolves into determining whether any bids were received.

If two or more bids are received, then the computing device may identifier the higher bid, or if two or more of the highest bids are identical, the first received. Then, in operation 916, the computing device transmits an acceptance notification to the mobile device of the winning bidder and to the first registered user's mobile device, and effects that exchange between their respective currency accounts at the bid values.

Reference will now be made to FIGS. 10*a* to 10*h*, which diagrammatically illustrate a series of simplified example interfaces that may be rendered on a display screen of a mobile device. The interfaces may be generated by a foreign currency application executing on the mobile device. The foreign currency application may be registered with a remote computing device having access to one or more accounts associated with the foreign currency application. The foreign currency application may require login and password or biometric credentials to access account data or to enable some operations. In some cases, the foreign currency application may be a banking mobile application associated with a financial institution.

On detecting a trip end condition, the mobile device may be prompted to display a notification such as is shown in FIG. 10*a*, in which the user is notified that a trip end condition appears to have been detected in association with a particular foreign country. The notification may invite the user to specify whether they have excess foreign currency or not. That is, in some cases the user may not wish to have the mobile device and/or computing device assist with expending foreign currency even if the user holds excess foreign currency either in cash or in electronic form.

Assuming the user confirms through the interface that he or she has excess foreign currency, then the mobile device may obtain foreign currency balance data from the remote computing device and may display the balance in an interface to seek confirmation that the balance is deemed "excess". As shown in FIG. 10*b*, the user may have the option of confirming the total or editing the total. That is, the user may reduce the amount if he or she only considers a part of the balance to be "excess". In some cases, the user may increase the amount if he or she holds cash that they consider "excess". Note that an increase in the total above the quantity specified in electronic records for the balance in the foreign currency account may make some transactions, like foreign exchange, unavailable.

FIG. 10c shows an example notification inquiring as to whether the registered user would like offers from nearby merchants for expenditure of the excess foreign currency. Assuming the user consents, then the computing device may carry out operations such as those described in connection with FIG. 6 or 7, for example, and may provide a display of available offers, as shown in FIG. 10d.

In some implementations, the mobile device may display an interface inviting the registered user to exchange the excess foreign currency with another user, as indicted by FIG. 10e. In this example, the displayed interface offers an exchange to a home currency, such as USD, or the option of selecting a different currency.

FIG. 10f shows an example interface for specifying auction options for a foreign exchange auction, including the display of current exchange rate data, the available bank exchange rate, less fees. The display may permit adjustment of the bid floor, as indicated by the black arrows.

If the user proceeds with an exchange of excess foreign currency, the mobile device may display a waiting screen, as indicated by FIG. 10g, while the computing device identifies registered users willing to participate in the potential foreign exchange. In the case of an auction, the mobile device may display the waiting screen or may, if the auction window is a significant time, display an icon or other notification in a status bar or elsewhere indicating that an auction is ongoing. The registered user will be unable to access or use the foreign currency account once an auction is initiated since the funds will be locked. In some cases, the user may have the option of cancelling the auction before the auction time window closes without completing the auction, in which case the foreign currency funds may become available again.

If an exchange is accepted by another registered, or a bidder is determined to have won the auction, then a success page may be displayed as indicted by FIG. 10h.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computing device for automatically prompting a foreign currency transaction in connection with travel, the computing device comprising:
a processor;
a network connection coupled to the processor;
a memory coupled to the processor and storing processor-executable instructions that, when executed, are to cause the processor to:
receive geolocation data from a mobile device linked to a registered user;
detect a trip end condition for the registered user with respect to a trip to a foreign location associated with a foreign currency different from a home currency, wherein detecting the trip end condition is based, at least in part, on determining that the geolocation data matches a departure location in the foreign location; and
responsive to detection of the trip end condition,
determine that the registered user has an associated remaining foreign currency balance;
identify at least one option for using the remaining foreign currency balance at the departure location; and
send, via the network connection, a notification to the mobile device for output on a display of the mobile device, the notification providing the at least option to expend the remaining foreign currency balance at the departure location.

2. The computing device of claim 1, wherein the at least one option, when actuated on the mobile device, is to result in receiving an instruction from the mobile device to initiate a transaction to use the remaining foreign currency balance so as to empty the foreign currency account.

3. The computing device of claim 1, wherein the geolocation data includes one or more of global positioning data or WiFi location data.

4. The computing device of claim 1, wherein the processor-executable instructions, when executed, are to cause the processor to detect the trip end condition in part based on detecting a transaction associated with the registered user with a merchant at the departure location.

5. The computing device of claim 4, wherein the transaction includes one or more of return of a rental car, purchase from an airport-located merchant, purchase from an international train station-located merchant, or payment of a baggage fee.

6. The computing device of claim 1, wherein the processor-executable instructions, when executed, are to further cause the processor to identify one or more merchants at the departure location, select one or more product offers from the one or more merchants based on the remaining foreign currency balance, and wherein the notification provides the one or more product offers.

7. The computing device of claim 1, wherein the at least one option includes converting the remaining foreign currency balance to another currency in another account associated with the registered user.

8. The computing device of claim 7, wherein the processor-executable instructions, when executed, are to further cause the processor to determine a next destination country for the registered user based on a stored itinerary, and wherein the another currency includes a foreign currency associated with the next destination country.

9. The computing device of claim 7, wherein the processor-executable instructions, when executed, are to further cause the processor to identify a second registered user having a second foreign currency account associated with the foreign currency, and wherein the at least one option includes exchanging the remaining foreign current balance for another currency from an account associated with the second registered user.

10. The computing device of claim 9, wherein the processor-executable instructions, when executed, are to cause the processor to identify the second registered user by detecting a trip start condition with respect to the second registered user for a trip to the foreign location.

11. The computing device of claim 10, wherein detecting the trip start condition includes detecting a trip start event or a trip booking event with regard to the second registered user.

12. A method of automatically prompting a foreign currency transaction in connection with travel, the method comprising:
- receiving geolocation data from a mobile device linked to a registered user;
- detecting a trip end condition for registered user with respect to a trip to a foreign location associated with a foreign currency different from a home currency, wherein detecting the trip end condition is based, at least in part, on determining that the geolocation data matches a departure location in the foreign location;
- responsive to detection of the trip end condition,
  - determining that a foreign currency account associated with the registered user has a remaining foreign currency balance;
  - identifying at least one option for using the remaining foreign currency balance at the departure location; and
  - sending, via a network connection, a notification to the mobile device for output on a display of the mobile device, the notification providing the at least one option to expend the remaining foreign currency balance at the departure location.

13. The method of claim 12, wherein the at least one option, when actuated on the mobile device, results in receiving an instruction from the mobile device to initiate a transaction to use the remaining foreign currency balance so as to empty the foreign currency account.

14. The method of claim 12, wherein the geolocation data includes one or more of global positioning data or WiFi location data.

15. The method of claim 12, wherein detecting the trip end condition is in part based on detecting a transaction associated with the registered user with a merchant at the departure location.

16. The method of claim 15, wherein the transaction includes one or more of return of a rental car, purchase from an airport-located merchant, purchase from an international train station-located merchant, or payment of a baggage fee.

17. The method of claim 12, further comprising identifying one or more merchants at the departure location, selecting one or more product offers from the one or more merchants based on the remaining foreign currency balance, and wherein the notification provides the one or more product offers.

18. The method of claim 12, wherein the at least one option includes converting the remaining foreign currency balance to another currency in another account associated with the registered user.

19. The method of claim 18, further comprising determining a next destination country for the registered user based on a stored itinerary, and wherein the another currency includes a foreign currency associated with the next destination country.

20. The method of claim 18, further comprising identifying a second registered user having a second foreign currency account associated with the foreign currency, and wherein the at least option includes exchanging the remaining foreign current balance for another currency from an account associated with the second registered user.

21. The method of claim 20, wherein identifying the second registered user includes detecting a trip start condition with respect to the second registered user for a trip to the foreign location.

22. The method of claim 21, wherein detecting the trip start condition includes detecting a trip start event or a trip booking event with regard to the second registered user.

* * * * *